United States Patent
Kasai et al.

[11] Patent Number: 6,062,297
[45] Date of Patent: May 16, 2000

[54] HONEYCOMB REGENERATOR

[75] Inventors: Yoshiyuki Kasai, Gifu; Kazuhiko Umehara, Nagoya; Wataru Kotani, Kasugai, all of Japan

[73] Assignee: NGK Insulators, Ltd., Japan

[21] Appl. No.: 09/256,309

[22] Filed: Feb. 24, 1999

[30] Foreign Application Priority Data

Feb. 27, 1998 [JP] Japan ................................. 10-047296

[51] Int. Cl.[7] ........................................................ F23L 15/02
[52] U.S. Cl. ............................ 165/9.1; 165/9.2; 432/180; 432/181
[58] Field of Search ............................ 431/215, 11, 328, 431/326, 170; 165/4, 10, 9.2, 9.3; 432/179, 180, 181, 209; 126/91 A

[56] References Cited

U.S. PATENT DOCUMENTS

| | | | |
|---|---|---|---|
| 1,771,286 | 7/1930 | Brassert et al. ........................ | 165/9.2 |
| 2,446,420 | 8/1948 | Irwin ........................................ | 165/9.3 |
| 5,755,569 | 5/1998 | Berg et al. .............................. | 432/181 |

FOREIGN PATENT DOCUMENTS

| | | |
|---|---|---|
| 58-26036 | 2/1983 | Japan . |
| 4-251190 | 9/1992 | Japan . |

Primary Examiner—James C. Yeung
Attorney, Agent, or Firm—Parkhurst & Wendel, L.L.P.

[57] ABSTRACT

A honeycomb regenerator for receiving a waste heat in an exhaust gas by passing an exhaust gas and a gas to be heated alternately therethrough, which is constructed by stacking a plurality of honeycomb structural bodies, is disclosed. In the honeycomb regenerator according to the invention, cell open rates of the honeycomb structural bodies positioned at an inlet portion of the exhaust gas and at an inlet portion of the gas to be heated are larger than those of the honeycomb structural bodies positioned at a center portion.

4 Claims, 2 Drawing Sheets bodies and especially relates to the honeycomb regenerator used in an exhaust gas having a high temperature or a corrosive exhaust gas having a high temperature.

HONEYCOMB REGENERATOR

BACKGROUND OF THE INVENTION

1. Field of the Invention

The present invention relates to a honeycomb regenerator for recovering a waste heat in an exhaust gas by passing the exhaust gas and a gas to be heated alternately therethrough, which is constructed by stacking a plurality of honeycomb structural bodies and especially relates to the honeycomb regenerator used in an exhaust gas having a high temperature or a corrosive exhaust gas having a high temperature.

2. Description of Related Art

In a combustion heating furnace used for industries such as a blast furnace, an aluminum melting furnace, a glass melting furnace or the like, a regenerator used for improving a heat efficiency, in which a firing air is pre-heated by utilizing a waste heat of an exhaust gas, has been known. As such regenerators, Japanese Patent Laid-Open Publication No. 58-26036 (JP-A-58-26036) discloses regenerators utilizing inexpensive ceramic balls, saddles, pellets or the like. Such regenerators mentioned above can be constructed in an inexpensive manner. However, there are such drawbacks, that a pressure loss is higher when the exhaust gas or an air for firing (i.e. the gas to be heated) is passed through the regenerators, and, that a heat exhanging area of the regenerators per a unit volume is smaller.

In order to overcome such drawbacks, Japanese Patent Laid-Open Publication No. 4-251190 (JP-A-4-251190) discloses a regenerator utilizing honeycomb structural bodies. In the honeycomb structural bodies, a pressure loss is lower when the exhaust gas or the like is passsed therethrough, and a heat exchanging area of the regenerators per a unit volume is larger. Therefore, it is possible to perform a heat exchanging operation effectively.

Generally, the exhaust gas sometimes includes low temperature solidifying components such as organic polymer or the like. In the combustion heating furnace used for industries, a processing apparatus or the like, in which the regenerators mentioned above are utilized, the regenerators positioned at an inlet portion of the gas to be heated are characterized by relatively low temperature. In this case, the low temperature solidifying components in the exhaust gas are sometimes solidified on the regenerators having a low temperature, a pressure loss becomes higher when the exhaust gas or the air for firing is passed through the regenerators. Therefore, for example, when use is made of the known inexpensive regenerators, the regenerators are changed in a short time period and used again after they are washed. On the other hand, even when use is made of the honeycomb structural body, the low temperature solidified components in the exhaust gas is solodified in through holes defining cells of the honeycomb structural body and the through holes are stuffed. Therefore, there is a drawback such that a pressure loss becomes also higher when the exhaust gas or the like is passed through the honeycomb structural body.

In order to overcome the drawback mentioned above, a high temperature gas is introduced from an inlet side of the air for firing by utilizing, for example, a burner so as to remove the low temperature solidifying components stuffed in the through holes by firing or vaporizing them. This means is hereinafter abbreviated as after burner. The after burner is utilized since the honeycomb structural body is very expensive as compared with the known regenerators and since the honeycomb structural body is liable to be fractured and a simple regenerating means such as changing or re-using after washing is not applied to the honeycomb structural body.

However, if the low temperature solidifying components are to be removed by the after burner as mentioned above in the honeycomb structural body, it is necessary to perform such removing operation in a relatively short time period during a furnace operation stop. Therefore, there occurs a problem that the honeycomb structural body is often fractured due to a thermal shock or the like. Moreover, since the honeycomb regenerator according to the invention is constructed by stacking a plurality of honeycomb structural bodies, there occurs a problem that the stacked honeycomb is broken and is not served as the honeycomb regenerator if the lower honeycomb structural body faced to the gas to be heated is fractured.

SUMMARY OF THE INVENTION

An object of the invention is to eliminate the drawbacks mentioned above and to provide a honeycomb regenerator in which a honeycomb structural body is not fractured in the case of removing low temperature solidifying components and a heat exchanging efficiency is not lowered.

According to the invention, a honeycomb regenerator for receiving a waste heat in an exhaust gas by passing an exhaust gas and a gas to be heated alternately therethrough, which is constructed by stacking a plurality of honeycomb structural bodies, is characterized in that cell open rates of the honeycomb structural bodies positioned at an inlet portion of the exhaust gas and at an inlet portion of the gas to be heated are larger than those of the honeycomb structural bodies positioned at a center portion.

Prior to explaining embodiments according to the invention, a technical function of the honeycomb regenerator mentioned above will be explained as follows. The regenerator stores heat when the exhaust gas having a high temperature is introduced and radiates heat when the air for firing (gas to be heated) having a low temperature is introduced. Such heat storing and heat radiating are performed on a surface of the regenerator. Therefore, in the case of using the same material, a temperature ascending or descending is performed more swiftly if a surface area is larger. From this point of view, since the honeycomb structural body has a larger heat exchanging area than that of the known ceramic ball, pellet or the like, it is effective for the regenerator. However, the honeycomb structural body is liable to be deteriorated remarkably due to a temperature variation. In this case, if a cell open rate at a high temperature portion is larger, a geometrically specific surface becomes lower and thus the heat exchanging area becomes smaller. If the heat exchanging area is small, a heat amount storing or radiating per a unit time becomes smaller. In this case, a temperature ascending or descending rate of the honeycomb structural body itself becomes slow, and thus a thermal shock thereto also becomes small.

Contrary to this, in order to serve as the regenerator, it is necessary to make the heat exchanging area larger. This is because heat storing and heat radiating properties can be improved if a geometrically specific surface becomes larger and the heat exchanging area becomes also larger by decreasing a cell open rate of the high temperature portion in which a heat amount is partly absorbed. Moreover, in the honeycomb structural body at an inlet portion of the air for firing, it is generally preferred to increase a geometrically specific surface by decreasing a cell open rate of the honeycomb structural body. However, since the after burn is performed for removing the low temperature solidifying components in the exhaust gas, the honeycomb structural body mentioned above is brought into contact with a high temperature gas as is the same as the honeycomb structural body at an inlet portion of the exhaust gas. Therefore, the cell open rate increases as is the same as the inlet portion of the exhaust gas. Further, the low temperature solidifying components are solidified on the regenerator at which the exhaust gas is under a solidifying point, and is generally solidified just near the inlet portion of the air for forming. Therefore, it is possible to prevent a stuffing of the through holes due to solidified components by increasing the cell open rate of the inlet portion of the air for firing.

As compared with the known construction, in the honeycomb regenerator in which all the honeycomb structural bodies are large, the thermal shock generated at the inlet portion of the exhaust gas during a furnace working or generated at the inlet portion of the air for firing during the after burn can be reduced, and thus it is possible to improve an endurance property of the honeycomb structural body. However, in this case, the heat exchanging area becomes smaller and thus it is not possible to recover a waste heat from the exhaust gas sufficiently. In order to recover a waste heat sufficiently, it is necessary to increase a volume of the honeycomb structural body and thus it is not preferred. Moreover, in the honeycomb regenerator in which all the cell open rates of the honeycomb structural bodies are small, it is possible to recover a waste heat sufficiently. However, the honeycomb structural body is fractured due to the thermal shock generated at the inlet portion of the exhaust gas during a furnace working or generated at the inlet portion of the air for firing during the after burn, and thus the overall honeycomb regenerator is broken due to the fracture of the honeycomb structural body. Therefore, the honeycomb regenerator is not sometimes functioned.

In the construction according to the invention, the cell open rates of the honeycomb structural bodies positioned at the inlet portion of the exhaust gas and at the inlet portion of the air for firing are made larger. Therefore, the thermal shock generated at the portions mentioned above can be reduced, and the endurance property of the honeycomb structural body can be improved. In addition, since the cell open rates of the honeycomb structural bodies positioned at the center portion are made smaller, it is possible to recover a waste heat sufficiently. Moreover, since the cell open rate of the inlet portion of the air for firing is made larger, it is also possible to prevent the stuffing of the through holes due to the low temperature solidifying components. In addition, it is possible to reduce the number of removing operations of the low temperature solidifying components by firing or vaporizing. Therefore, the honeycomb regenerator according to the invention can be functioned as an extremely preferred regenerator in which the endurance property is excellent.

DESCRIPTION OF THE PREFERRED EMBODIMENT

Figure 1:
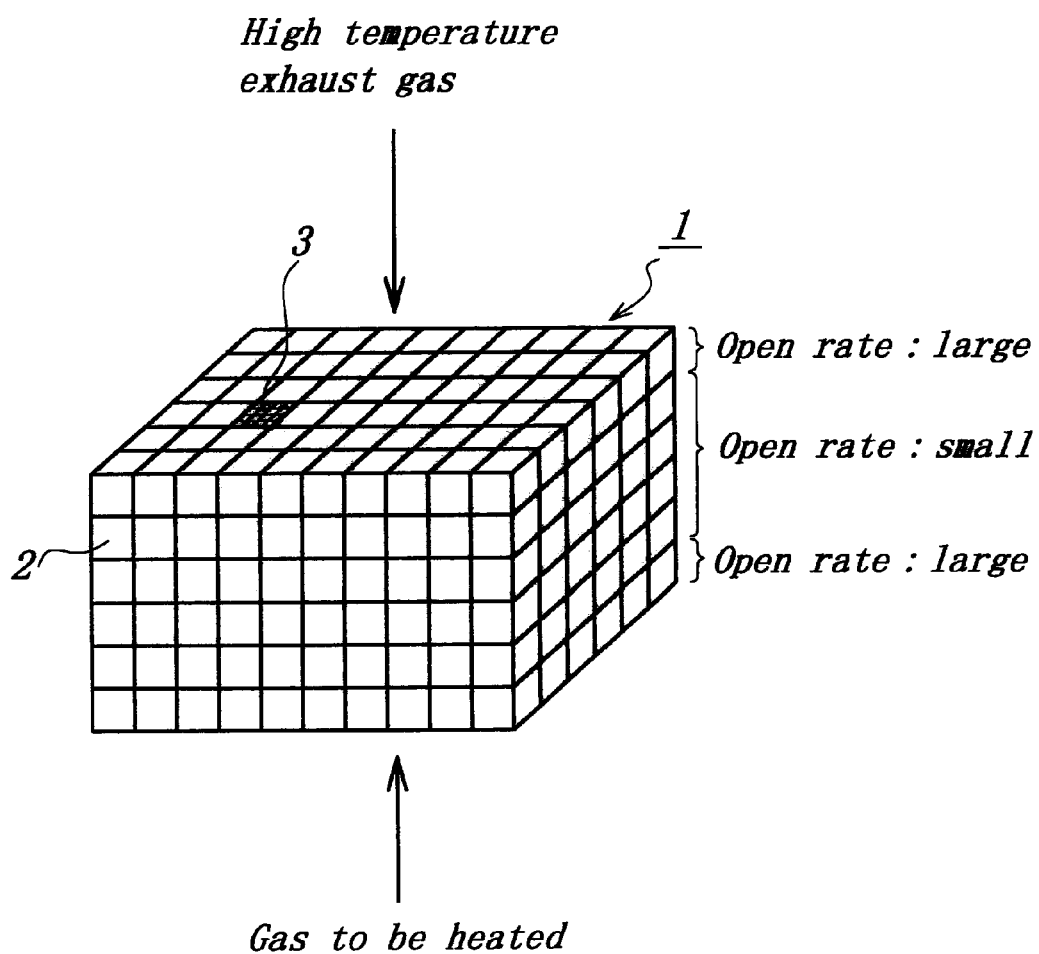
FIG. 1 is a schematic view showing one embodiment of a honeycomb regenerator according to the invention.

FIG. 1 is a schematic view showing one embodiment of a honeycomb regenerator according to the invention. In the embodiment shown in FIG. 1, a honeycomb regenerator 1 is formed by stacking a plurality of honeycomb structural bodies 2 having a rectangular shape in such a manner that flow passages thereof constructed by through holes 3 are aligned in one direction (in this case six honeycomb structural bodies are stacked). In FIG. 1, an upper portion of the honeycomb regenerator 1 is constructed by the honeycomb structural bodies 2 at a high temperature side to which an exhaust gas is contacted, and a lower portion of the honeycomb regenerator 1 is constructed by the honeycomb structural bodies 2 at a low temperature side to which a gas to be heated is contacted.

The feature of the invention is that, in the honeycomb regenerator 1 having the construction mentioned above, cell open rates of the honeycomb structural bodies 2 positioned at the high temperature side i.e. an inlet portion of the exhaust gas and at the low temperature side i.e. an inlet portion of the gas to be heated are larger than those of the honeycomb structural bodies positioned at a center portion. In the embodiment shown in FIG. 1, all the honeycomb structural bodies have the same dimension, but the cell open rates of respective honeycomb structural bodies differ from those of the honeycomb structural bodies 2 positioned at respective one layer of the high temperature side and the low temperature side to those of the honeycomb structural bodies 2 positioned at four layers of the center portion.

The honeycomb structural bodies 2 having different cell open rates can be obtained by preparing metal molds having different cell open rates respectively, extruding a ceramic batch by using the thus prepared metal molds to obtain ceramic bodies, and firing the thus obtained ceramic bodies. Moreover, as a material of the honeycomb structural body 2, use is made of all the known materials for the regenerator. In this case, it is preferred to use alumina, cordierite, mullite, aluminum-titanate, silicone carbide, silicone nitride, zirconia or porcelain as a main ingredient.

Figure 2:
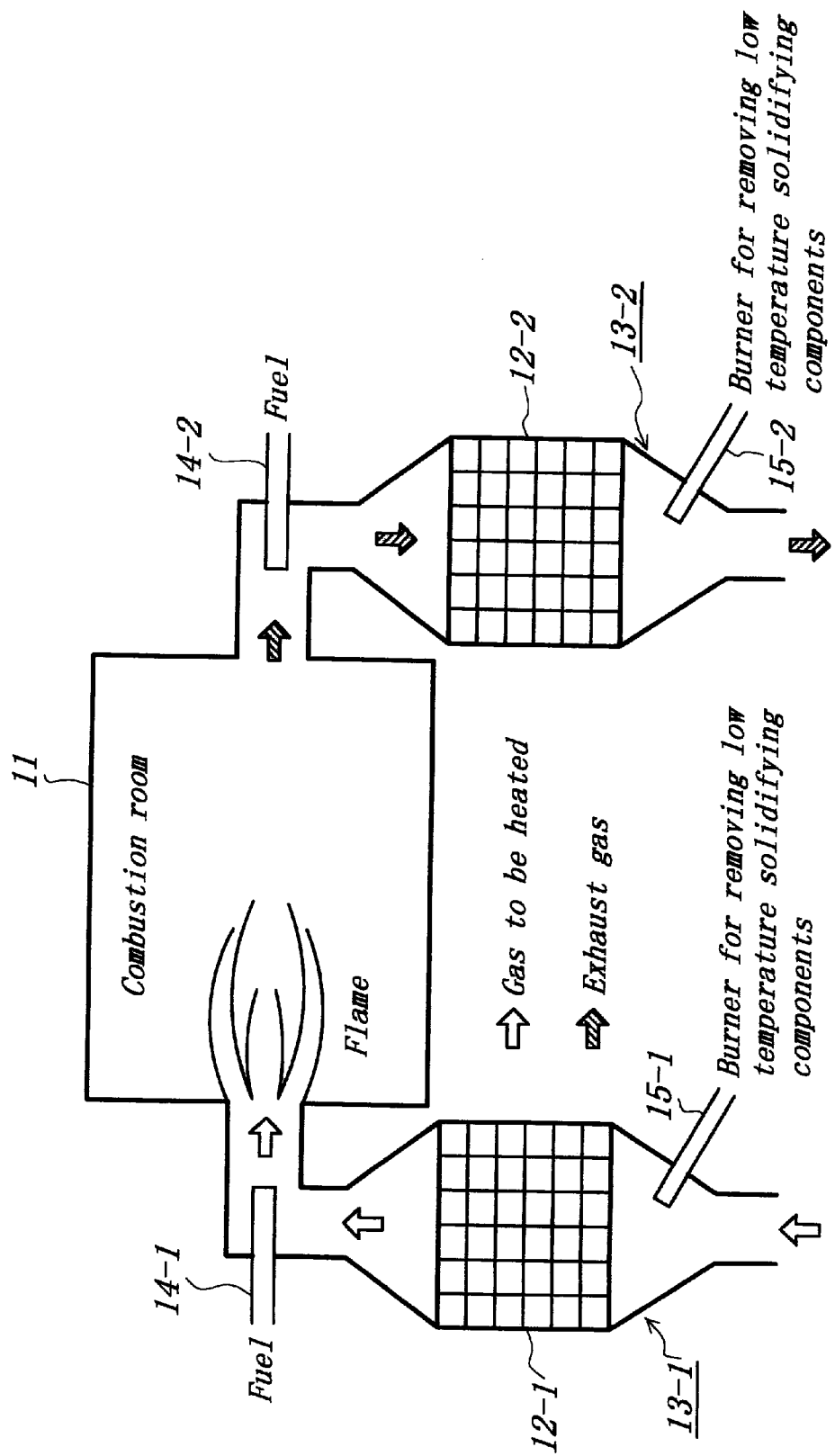
FIG. 2 is a schematic view illustrating one embodiment such that a heat exchanging apparatus utilizing the honeycomb regenerator according to the invention is applied to a combustion room of a combustion heating furnace.

FIG. 2 is a schematic view showing one embodiment such that a heat exchanging apparatus utilizing the honeycomb regenerator according to the invention is applied to a combustion room of a combustion heating furnace. In the embodiment shown in FIG. 2, a numeral 11 is a combustion room, numerals 12-1 and 12-2 are a honeycomb regenerator having a construction shown in FIG. 1, numerals 13-1 and 13-2 are a heat exchanging apparatus constructed by the honeycomb regenerator 12-1 or 12-2, numerals 14-1 and 14-2 are a fuel supply inlet arranged at an upper portion of the heat exchanging apparatus 13-1 or 13-2, and numerals 15-1 and 15-2 are a burner for removing low temperature solidifying components arranged at an lower portion of the heat exchanging apparatus 13-1 or 13-2. In the embodiment shown in FIG. 2, two heat exchanging apparatuses 13-1 and 13-2 are arranged for performing the heat storing operation and the heating operation at the same time. That is to say, when one of them performs the heat storing operation, the other can perform the heating operation at the same time, thereby performing the heat exchanging operation effectively.

In the embodiment shown in FIG. 2, an air to be heated is supplied upwardly from a lower portion in the one honeycomb regenerator 12-1. The air is passed through the honeycomb regenerator 12-1 and is then mixed with a fuel supplied from the fuel supply inlet 14-1. Then, a flame is ignited in the combustion room 11. The exhaust gas after combustion is supplied downwardly from an upper portion in the other honeycomb regenerator 12-2, and a waste heat in the exhaust gas is stored in the honeycomb regenerator 12-2. Then, the exhaust gas having a low temperature after heat radiation is discharged from the honeycomb regenerator 12-2. After that, a flowing direction of the air is changed, and the air to be heated is supplied upwardly from a lower portion in the honeycomb regenerator 12-2 in which a waste heat is stored previously. In this case, a heat exchanging operation is performed in the honeycomb regenerator 12-2. Then, the air is mixed with a fuel supplied from the fuel supply inlet 14-2 at the upper portion of the pre-heated honeycomb regenerator 12-2. Then, a flame is ignited in the combustion room 11. The exhaust gas is passed through the honeycomb regenerator 12-1 and is discharged outwardly. In this case, the honeycomb regenerator 12-1 stores a waste heat in the exhaust gas in the same manner as mentioned above.

Moreover, a removing operation of the low temperature solidifying components by firing or vaporizing is performed by means of the burners 15-1 and 15-2 when the normal operation mentioned above is stopped. In this case, the low temperature solidifying components are liable to be gathered in the honeycomb structural bodies 2 having a lowest temperature i.e. the lowermost honeycomb structural bodies 2 in FIG. 1. Therefore, under a condition such that the lowermost honeycomb structural bodies 2 positioned at an inlet portion of the gas to be heated are heated by supplying an air upwardly from the lower portion in the heat exchanging apparatuses 13-1, 13-2 and generating flames from the burners 15-1 and 15-2 at the same time so as to fire or vaporize the low temperature solidifying components. After that, the thus fired or vaporized exhaust gas is moved into the combustion room 11 and then discharged outwardly.

Hereinafter, actual experiments will be explained.

At first, honeycomb structural bodies having rib thickness of 25 mil, cell number of 30 cpsi and open rate of 74.5% and honeycomb structural bodies having rib thickness of 17 mil, cell number of 100 cpsi and open rate of 68.9% were prepared as the examples having a large cell open rate and a small cell open rate, respectively. Two kinds of honeycomb structural bodies mentioned above were manufactured according to the known manufacturing method from ceramic batch having the same chemical composition mainly made of alumina. In addition, all the honeycomb regenerators having the shape shown in FIG. 1 were formed by using the thus prepared honeycomb structural bodies according to constructions A to C shown in the following Table 1. In this case, respective honeycomb regenerator comprised one layer of the honeycomb structural bodies positioned at the inlet portion of the exhaust gas, four layers of the honeycomb structural bodies positioned at the center portion and one layer of the honeycomb structural bodies positioned at the inlet portion of the gas to be heated, as shown in FIG. 1.

Then, the thus obtained honeycomb regenerators were installed in a test apparatus and subjected to an aging test in which they were maintained at a predetermined temperature for 1000 hours total. In this case, the removing operations of the low temperature solidifying components by means of the burners were performed at every 24 hours. During the aging test, a temperature of the exhaust gas passed through the honeycomb regenerator was measured at the inlet portion of the gas to be heated, and a pressure loss ratio was measured when the exhaust gas or the gas to be heated was passed through the honeycomb regenerator. The pressure loss ratio was measured in such a manner that a pressure loss of the construction B in which all the honeycomb structural bodies were constructed by the honeycomb structural body having a small cell open rate was assumed as I and it was obtained from a comparison result with respect to the construction B. Moreover, after the aging test, appearances of the honeycomb structural bodies in respective honeycomb regenerator was investigated. In this appearance investigation, the results were categorized as O: no crack generation or X: crack generation. The results were shown in Table 1.

TABLE 1

|  | Construction A | | | Construction B | | | Construction C | | |
| --- | --- | --- | --- | --- | --- | --- | --- | --- | --- |
|  | Rib thickness (mil) | Cell number (cpsi) | Open rate (%) | Rib thickness (mil) | Cell number (cpsi) | Open rate (%) | Rib thickness (mil) | Cell number (cpsi) | Open rate (%) |
| Inlet portion of exhaust gas | 25 | 30 | 74.5 | 17 | 100 | 68.9 | 25 | 30 | 74.5 |
| Center portion | 25 | 30 | 74.5 | 17 | 100 | 68.9 | 17 | 100 | 68.9 |
| Inlet portion of air for firing | 25 | 30 | 74.5 | 17 | 100 | 68.9 | 25 | 30 | 74.5 |
| Gas temperature of air inlet portion | 250° C. | | | 150° C. | | | 180° C. | | |
| Pressure loss ratio | 0.8 | | | 1.0 | | | 0.85 | | |
| Honeycomb appearance of exhaust gas inlet portion | O | | | X | | | O | | |
| Honeycomb appearance of center portion | O | | | O | | | O | | |
| Honeycomb appearance of air inlet portion | O | | | X | | | O | | |
| Remarks | Comparative example | | | Comparative example | | | Present invention | | |

As clearly understood from the results shown in Table 1, in the construction B in which all the honeycomb structural bodies have a small cell open rate as the comparative example, cracks were generated in the honeycomb structural bodies at the inlet portions of the exhaust gas and the gas to be heated. Moreover, in the construction C in which all the honeycomb structural bodies have a large cell open rate, cracks were not generated in the honeycomb structural bodies. However, a temperature of the exhaust gas during aging test was increased at the inlet portion of the gas to be measured, and thus a waste heat was not recovered sufficiently. On the other hand, in the construction C as the present invention, cracks were not generated in the honeycomb structural bodies at the both inlet portions of the exhaust gas and the gas to be heated. In addition, it is confirmed that a temperature of the exhaust gas was low at the inlet portion of the gas to be heated and a waste heat was recovered sufficiently. Further, in the construction A as the comparative example and the construction C as the present invention, a pressure loss was low as compared with the construction B as the comparative example, and thus it is assumed that it is possible to reduce an interval of the after burner operation as compared with the above interval of every 24 hours.

The present invention is not limited to the embodiment mentioned above, but various modifications are possible. For example, in the embodiments mentioned above, the honeycomb structural bodies having a large cell open rate arranged at the both inlet portions of the exhaust gas and the gas to be heated are one layer respectively, but it is a matter of course that the number of the layers mentioned above is not limited to one layer. For example, if a height of one layer is low, it is possible to use 2 or more layers of the honeycomb structural bodies.

As clearly understood from the explanations, according to the invention, the cell open rates of the honeycomb structural bodies positioned at the inlet portion of the exhaust gas and at the inlet portion of the air for firing are made larger. Therefore, the thermal shock generated at the portions mentioned above can be reduced, and the endurance property of the honeycomb structural body can be improved. In addition, since the cell open rates of the honeycomb structural bodies positioned at the center portion are made smaller, it is possible to recover a waste heat sufficiently. Moreover, since the cell open rate of the inlet portion of the gas to be heated is made larger, it is also possible to prevent the stuffing of the through holes due to the low temperature solidifying components. In addition, it is possible to reduce the number of removing operations of the low temperature solidifying components by firing or vaporizing. Therefore, the honeycomb regenerator according to the invention can be functioned as an extremely preferred regenerator in which the endurance property is excellent. Further, the number of the after burn operation can be reduced.

What is claimed is:

1. A honeycomb regenerator for receiving a waste heat in an exhaust gas by passing an exhaust gas and a gas to be heated alternately therethrough, which is constructed by stacking a plurality of honeycomb structural bodies, characterized in that cell open rates of the honeycomb structural bodies positioned at an inlet portion of the exhaust gas and at an inlet portion of the gas to be heated are larger than those of the honeycomb structural bodies positioned at a center portion.

2. The honeycomb regenerator according to claim 1, wherein said honeycomb structural bodies are made of ceramics.

3. The honeycomb regenerator according to claim 2, wherein said honeycomb structural bodies are made of alumina, cordierite, mullite, aluminum-titanate, silicone carbide, silicone nitride, zirconia or porcelain as a main ingredient.

4. The honeycomb regenerator according to claim 1, wherein said honeycomb structural bodies positioned at an inlet portion of the exhaust gas and at an inlet portion of the gas to be heated construct one layer respectively.

* * * * *